Oct. 3, 1950  S. SAUL, JR  2,524,085
TILTABLE TOP WORK TABLE
Filed Dec. 13, 1945  3 Sheets-Sheet 1
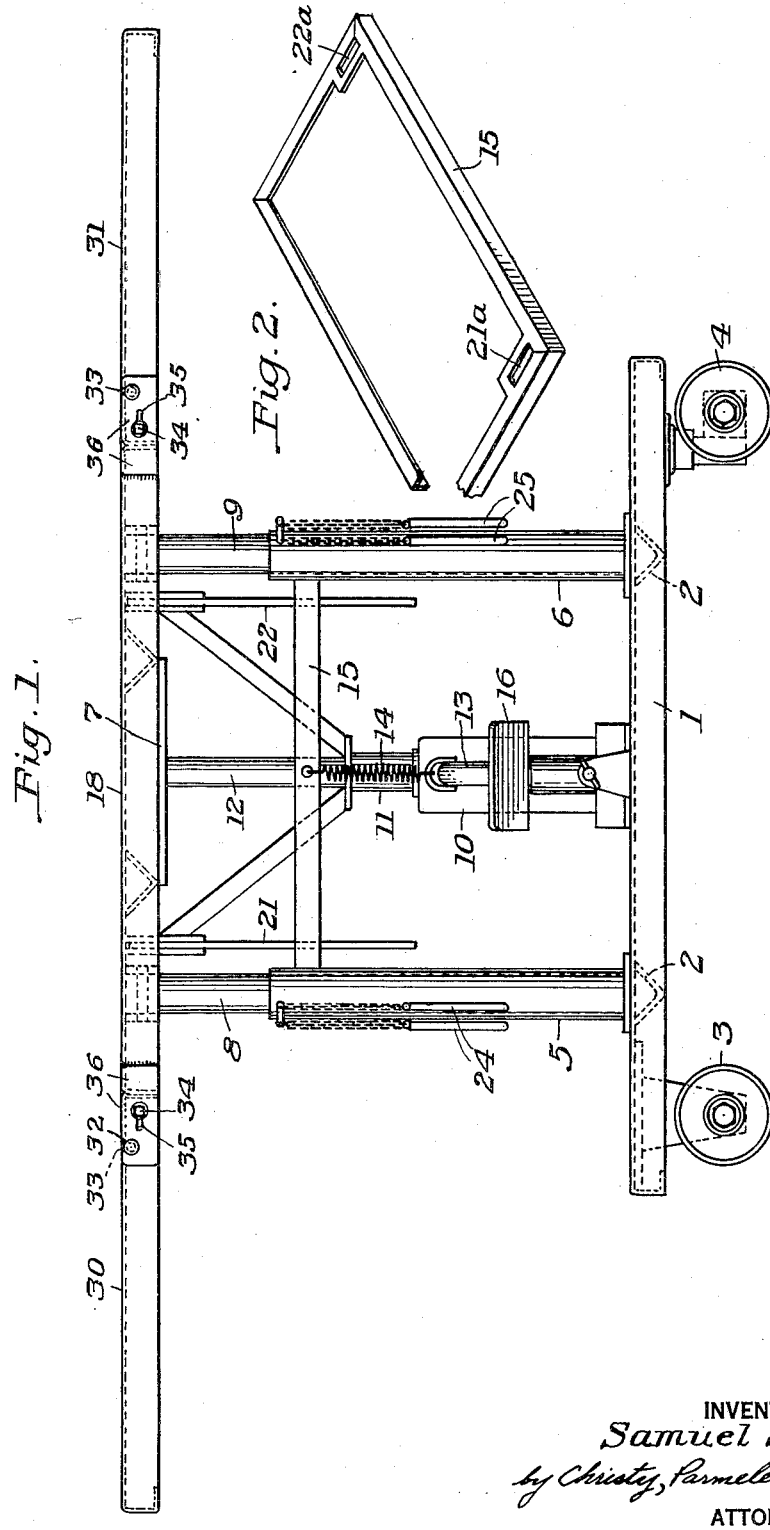
INVENTOR
*Samuel Saul, Jr.*
by *Christy, Parmelee and Strickland*
ATTORNEYS Oct. 3, 1950 S. SAUL, JR 2,524,085
TILTABLE TOP WORK TABLE
Filed Dec. 13, 1945 3 Sheets-Sheet 2
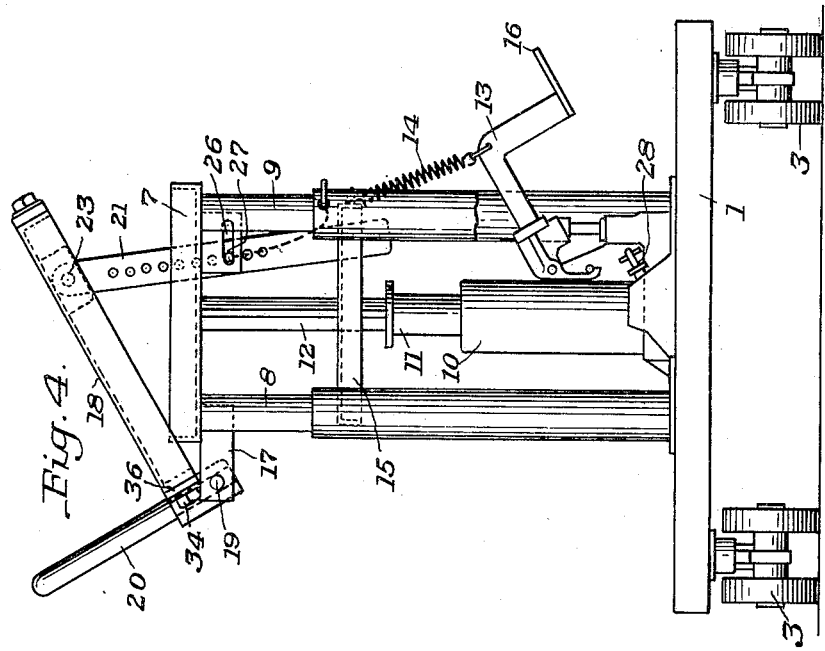
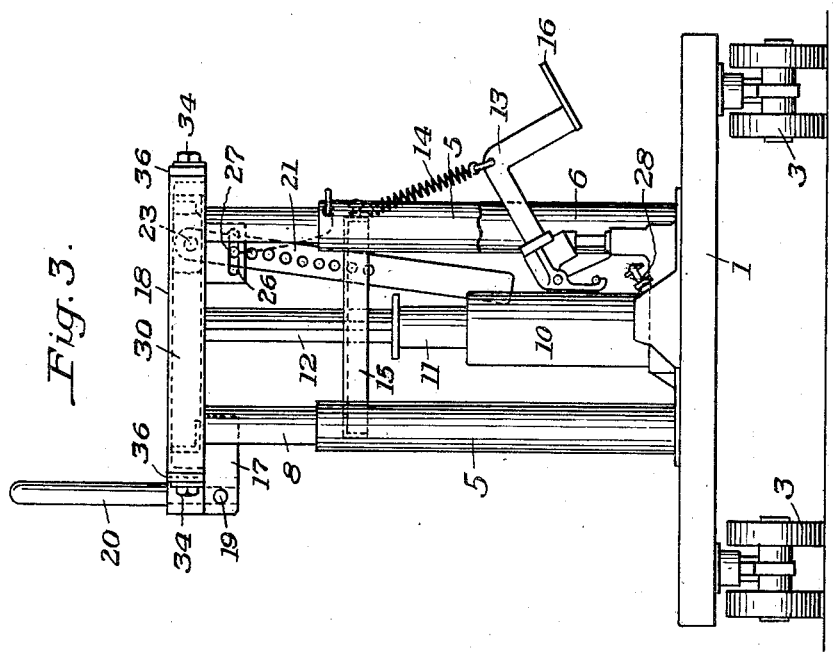
INVENTOR
Samuel Saul, Jr.
by Christy, Parmelee and Strickland
ATTORNEYS Oct. 3, 1950 S. SAUL, JR 2,524,085
TILTABLE TOP WORK TABLE
Filed Dec. 13, 1945 3 Sheets-Sheet 3
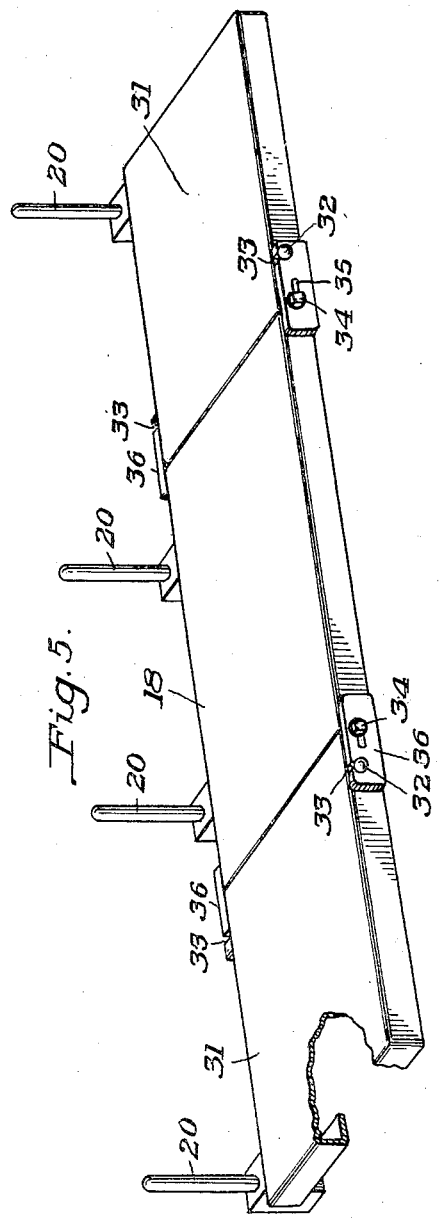
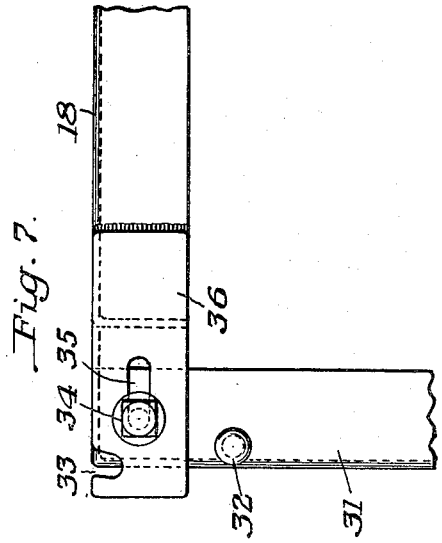
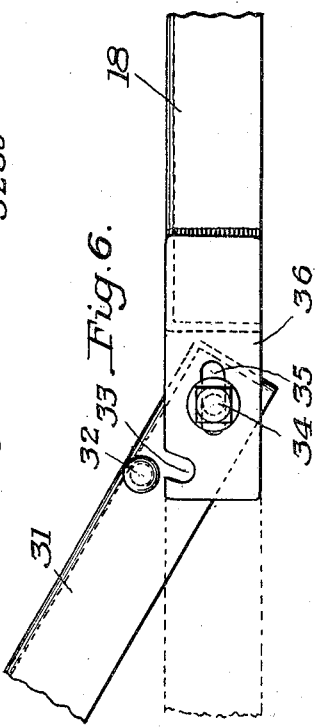
INVENTOR
Samuel Saul, Jr
by Christy, Parmelee and Strickland
ATTORNEYS Patented Oct. 3, 1950

2,524,085

UNITED STATES PATENT OFFICE 2,524,085

TILTABLE TOP WORKTABLE

Samuel Saul, Jr., Pittsburgh, Pa., assignor to Reconstruction Finance Corporation, Cleveland, Ohio, a corporation of the United States Application December 13, 1945, Serial No. 634,838

15 Claims. (Cl. 214—121)

My invention relates to a work table having an adjustable top. More specifically, it relates to a work table of general usefulness in factories and the like and having a top which can be raised to different heights and tilted to different degrees.

In most work tables as used in factories, mills and the like for handling heavy objects and moving them from one operation site to another, an outstanding disadvantage is that such tables are not sufficiently flexible to take care of the various desired handlings of such objects. For example, in many cases it is desirable to tilt the top of the table so as to either dump the objects supported thereon or to tilt them to facilitate some manufacturing operation or for other purposes. In order to do this, great manual effort is required due to the weight of most objects and materials handled, such as sheet steel or the like, and due to the fact that tables are normally devoid of any adjustments for readily allowing tilting of the top. Another difficulty is that most tables as used are not readily movable from place to place; furthermore, the tops thereof are not vertically adjustable so as to adapt them for different manufacturing processes, for example, to coincide with the level of a conveyor belt.

An object of my invention is to provide an adjustable work table which is devoid of the above-mentioned disadvantages of work tables as commonly used.

A more specific object of my invention is to provide a work table whose top is adjustable in height and adjustable in tilt.

A still more specific object of my invention is to provide a work table which may be readily moved from place to place and which is equipped with power amplifying means for facilitating raising of the top thereof to adjustable heights and which top is pivotally supported and adjustably tilted.

Other objects and advantages of my invention will become apparent from a study of the following specification taken with the accompanying drawings wherein:

Figure 1 is a front view of a work table having an adjustable top embodying the principles of my invention;

Figure 2 is a perspective view of the slotted guide member embodied in Figure 1;

Figure 3 is an end view of the table shown in Figure 1 wherein the top is in a horizontal position;

Figure 4 is an end view similar to Figure 2 showing the top in an inclined position;

Figure 5 is a perspective view of the table top in which one of the wing portions is partially cut away;

Figure 6 is an enlarged partial front view of the hinged portion of one of the wings shown in Figure 5; and Figure 7 is a view similar to Figure 6 showing how the wing of Figure 6 may hang vertically.

Referring more specifically to Figures 1 to 4 inclusive, numeral 1 denotes a base platform which is reinforced by angle bars shown in dotted lines denoted by numeral 2 which reinforced platform structure forms the subject matter of my earlier Patent No. 2,316,892 issued April 20, 1943, hence, which structure, per se, forms no part of the present invention. The base platform 1 is supported on casters such as 3 and 4 so as to facilitate movement of the table structure from place to place. Secured to the top of base platform 1 are four hollow support tubes, such as 5 and 6.

Referring more particularly to Figure 4, it will be noted that a top support platform 7 has four legs at the four corners thereof, such as legs 8 and 9, which are adapted to telescopically slide into the hollow support tubes and to be guided thereby as the top support platform is lifted or lowered.

A power amplifying means such as a jack 10 of any well-known type commonly used for raising automobiles and trucks, and which may be mechanically, hydraulically, or pneumatically operated, is rigidly mounted on base platform 1 and has a vertically movable portion 11 which is secured by column 12 to the under side of platform 7 at a central point of platform 7. Jack 10 has an operating arm 13 which is normally biased upwardly by means of a spring 14, which spring has one end connected to the bend portion of arm 13 and the other end secured to guide bracket 15. A pedal 16 is rigidly secured to arm 13 so that the operator may depress his foot thereon when it is desired to raise the movable portion 11 to lift the top support platform 7. Of course, spring 14 serves as a return spring to aid in the reciprocating movement of arm 13 which is desirable for operation of the jack as is well-known in the art.

A pivot supporting bracket 17 extends laterally outwardly from and is rigidly secured to the under side of platform 7. A table top 18 preferably reinforced in a manner similar to base platform 1 has one side thereof pivoted to bracket 17 by means of pins 19. A pair of support brackets 21 and 22 have one end thereof pivotally mounted to the bottom portion of top 18 by means of pivots or pins such as 23. Support brackets 21 and 22 have their other ends slidable through the guide slots 21a and 22a of guide bracket 15 shown more clearly in Figure 2 which guide bracket is rigidly secured to and supported by the hollow support tubes such as 5 and 6. As will be noted in Figure 1, a plurality of pins such as 24 and 25 may be conveniently suspended by chains fastened to the support tubes 5 and 6.

In operation, when it is desired to lift the table top and top support platform, the operator moves his foot up and down on pedal 16 so as to reciprocate arm 13 and thus raise movable portion 11 of the jack to raise top support platform 7 as well as the top 18 even while heavily loaded together with legs such as 8 and 9 which are guided during this movement by the hollow support tubes. When the desired height has been obtained, the operator places one of the pins, such as 24, in the hole in bracket 21 immediately above guide bracket 15. He then releases the air from jack 10 by opening valve 28 or otherwise operates the jack to effect lowering of the movable portion 11 and of platform 7 and to effect tilting of the table top 18 since the pin rigidly supports the right end, as viewed in Figure 4, on the surface of bracket 15. The amount of lowering will determine the angle of tilt of table top 18. If too much tilt is obtained, the jack may be reversed in operation to raise the unsupported end of table top 18 until the desired angle of tilt is obtained. After the desired angle of tilt is obtained, the operator places a pin 24 and a pin 25 in the particular holes in brackets 21 and 22, respectively, which are in registry with wide slots, such as 26, formed in bracket portions such as 27, which bracket portions depend from and are secured to the under side of platform 7. The pin which rested on the surface of bracket 15 may now be removed. The table will now appear as shown in Figure 4. The pins shown in the wide slots, such as 26, therefore, permanently maintain the table top at a predetermined tilt while the earlier described pin resting on bracket 15 and inserted in a lower hole in the bracket was used to adjust the tilt.

It will be seen, therefore, that top 18 has not only been raised, but also tilted with exertion of little manual effort. That is, even though top 18 may be loaded with heavy articles, such as heavy sheets of steel or pipe or the like, it is nevertheless possible to not only raise it, but to tilt it to any desired position by suitable operation of the jack. Stop members 20 are provided along one side, that is, the hinged side of top 18, so that articles supported on the table 18 will not slide off as the result of the tilting movement.

As will appear more clearly from Figures 5, 6 and 7, wing portions 30 and 31 are pivotally supported to opposite sides of the table top 18. Such wing portions are pivotally mounted in a manner so as to allow them to extend either in a manner so as to form an extension of top 18, as shown in Figure 5, or if desired, the wings may be lifted upwardly, as shown in Figure 6, so as to release pin 32 from slot 33 at which time the wing is moved away from the table top so that the pin will move to the left end of slot 35, as viewed in Figure 6, so that pin 32 may be dropped clear of the left edge of the lug 36 so as to assume the position shown in Figure 7, that is, dropped or depending downwardly in a vertical direction. Lug 36 is welded to the end of top 18.

Thus, is will be seen that I have provided a work table whose top may be selectively adjusted in height and degree of tilt, which work table is readily movable from station to station in a factory; furthermore, I have provided an adjustable work table which requires very little manual effort for making the above adjustments, hence, which can be raised and tilted even while carrying a very heavy load, and which work table is relatively simple in construction and inexpensive to manufacture.

While I have illustrated and escribed a single embodiment of my invention, it will be understood that this is by way of illustration only and that various changes and modifications may be made within the contemplation of my invention and within the scope of the following claims.

I claim:

1. A work table including a top and a platform adapted to support said top and to which said top is pivoted on one side, and including telescoping upper and lower legs for adjustably supporting said platform, a pair of supporting brackets pivotally secured to the underside of said top opposite said pivoted side, and adjustable means for providing different lengths of said supporting brackets between said top and said platform, said adjustable means comprising a plurality of holes disposed along said brackets, a slotted bracket rigidly secured to said platform, a pin which is slidable through the slotted bracket and into any of said holes depending on the amount of tilt desired, a jack for effecting relative movement of said upper and lower legs to vertically adjust said platform to vary the height of said table top, and a treadle for operating said jack.

2. A work table comprising a platform, a plurality of legs extending downwardly from the underside of said platform, a plurality of guide means into which said legs are telescopically fitted and guided, a base for supporting said guide means, a jack also supported by said base and having a vertically movable portion secured to the underside of said platform and having a treadle for operating the jack, a tiltable top pivotally mounted with respect to said platform, and adjustable support bracket means for selectively positioning one side of said top at different elevations with respect to the other to give adjustable degrees of tilt.

3. A work table comprising a platform, a plurality of legs extending downwardly from the underside of said platform, a plurality of guide means into which said legs are telescopically fitted and guided, a base for supporting said guide means, a jack also supported by said base and having a vertically movable portion secured to the underside of said platform for vertically adjusting the height of the platform, a tiltable top pivotally mounted with respect to said platform, and adjustable support bracket means for selectively positioning one side of said top at different elevations with respect to the other to give adjustable degrees of tilt, said adjustable support bracket means comprising a pair of brackets each having one end pivotally mounted on the underside of the top at the side opposite the pivoted mounting, said brackets having a plurality of holes, a pair of lugs depending from the underside of said platform each containing a slot, and pins which are adapted to be slid through said slots and through one of said holes of each bracket to support the raised portion of the top at selectively different elevated positions with respect to the hinged side thereof.

4. A work table comprising a platform, a plurality of legs extending downwardly from the underside of said platform, a plurality of guide means into which said legs are telescopically fitted and guided, a base for supporting said guide means, a jack also supported by said base and having a vertically movable portion secured to the underside of said platform for vertically adjusting the height of the platform, a tiltable top pivotally mounted with respect to said platform, and adjustable support bracket means for selectively positioning one side of said top at different elevations with respect to the other to give adjustable degrees of tilt, said base being mounted on casters, and said jack having an operating arm together with spring means for normally biasing said operating arm vertically upwardly.

5. A work table comprising a base platform mounted on casters, a plurality of vertically arranged hollow tubes supported on said platform, a table comprising a top supporting platform having depending legs slidable in and guided by said tubes, a jack mounted on said base platform and having a vertically movable part secured to the underside of said top supporting platform for adjustably raising it to different heights, a pivot supporting bracket extending laterally from said top supporting platform and one of said legs, table top having one side pivoted to said bracket, a pair of depending slotted brackets secured under the side of said top supporting platform opposite the pivotal mounting, a pair of support brackets having one end pivoted to the underside of said table top and having a plurality of holes, a pair of guide members supported by said hollow tubes and having slots through which said brackets are guided, a pair of pins, at least one adapted for insertion through said bracket hole immediately above a guide member to support an end of the table top as the other end is lowered to tilt the top to the desired degree, and a pair of pins subsequently insertable through said depending bracket slots and the registering bracket holes to permanently maintain said degree of tilt.

6. A work table comprising a platform, a plurality of legs extending downwardly from the underside of said platform, a plurality of guide means into which said legs are telescopically fitted and guided, a base for supporting said guide means, a jack also supported by said base and having a vertically movable portion secured to the underside of said platform for vertically adjusting the height of the platform, a tiltable top pivotally mounted with respect to said platform, and adjustable support bracket means for selectively positioning one side of said top at different elevations with respect to the other to give adjustable degrees of tilt, said top having a wing extending from one edge thereof, pivoted means for said wing including a pin and wide-slot connection for allowing said wing to extend either horizontally in alignment with said top or vertically downwardly so as to hang from said top.

7. A work table comprising a platform and a base, upper legs extending downwardly from said platform, lower legs fixed to said base and in telescopic relationship with said upper legs, a jack supported by said base and having a vertically movable portion secured to the underside of said platform and for vertically moving said platform and upper legs to adjust the height of said platform, a tiltable top pivotally mounted with respect to said platform, and adjustable support bracket means for selectively positioning one side of said top at different elevations with respect to the other to adjust the angle of tilt of said top.

8. In a supporting structure, a supporting member mounted for vertical movement, a tiltable member adapted to normally occupy a horizontal position on said supporting member, a pivot connecting said tiltable member to said supporting member, and a stationary support engageable with said tiltable member at a point spaced from said pivot for tilting said tiltable member out of said horizontal plane in response to vertical movement of said supporting member.

9. In combination with a vertically movable support, a table pivotally connected to said support, and a stationary member engageable with said table at a point spaced from its pivotal connection to said support for effecting pivotal movement of said table in response to vertical movement of said support.

10. In combination with a table, a supporting structure on which said table is carried, means for elevating said structure to adjust the vertical position of said table, a pivot connecting said table to said structure, and a stationary standard engageable with said table at a point spaced from said pivot for pivoting said table about said pivot in response to vertical movement of said structure.

11. In combination with a table, a supporting structure on which said table is carried, means for elevating said structure to adjust the vertical position of said table, said elevating means being operable to allow lowering of said structure and table by gravity, a pivot connecting said table to said structure, and a stationary standard engageable with said table at a point spaced from said pivot, said standard being operable to tilt said table about said pivot in response to gravitational lowering of said supporting structure.

12. In combination, a rectangular supporting structure having vertically extensible legs at the corners thereof, a jack for adjusting the vertical position of said supporting structure, a work table having a pivotal connection to one edge of said supporting structure, and a stationary standard engageable with said work table to effect tilting movement thereof about said connection in response to vertical movement of said support.

13. A work table having a main frame and a vertically movable platform, a top mounted on the platform for movement therewith and hinged thereto for angular adjustment thereon, means for operating the platform up and down, and means on the top arranged to be selectively engaged with the main frame or the platform whereby tilting movement of the top may be effected when the main frame is engaged and the top held in relatively fixed relation to the platform when the platform is engaged.

14. In combination with a table, a supporting structure on which said table is carried, means for elevating said structure to adjust the vertical position of said table, said elevating means being operable to allow lowering of said structure and table by gravity, a pivot connecting said table to said structure, a stationary bracket, a movable bracket mounted on said supporting structure, and a supporting standard connected to said table at a point spaced from said pivot for selective engagement with said stationary and movable brackets and operable in one position of engagement to tilt said table about its pivot in response to vertical movement of said supporting structure and in its other position of engagement to move said table vertically with said supporting structure without disturbing its angular inclination relative thereto.

15. In combination with a table, a vertically movable supporting structure, a pivot connecting said table to said structure, a standard having one end connected to said table at a point spaced from said pivot, and operating mechanism for raising and lowering said supporting structure including a pair of parts selectively engageable with the other end of said standard which are respectively operable when engaged with the standard to tilt said table about its pivot, and to move said table vertically without disturbing its angle of inclination in response to vertical movement of said support.

SAMUEL SAUL, JR.

REFERENCES CITED

The following references are of record in the file of this patent:

UNITED STATES PATENTS

| Number | Name | Date |
|---|---|---|
| 456,990 | Hawley | Aug. 4, 1891 |
| 1,295,680 | Benson | Feb. 25, 1919 |
| 1,527,895 | Mazoch | Feb. 24, 1925 |
| 1,590,296 | Klein et al. | June 29, 1926 |
| 1,786,884 | Allan | Dec. 30, 1930 |
| 1,843,852 | Troy | Feb. 2, 1932 |
| 1,906,552 | Demint | May 2, 1933 |
| 2,213,766 | Johnson | Sept. 3, 1940 |
| 2,251,797 | Leland | Aug. 5, 1941 |
| 2,316,892 | Saul | Apr. 20, 1943 |
| 2,335,692 | Murray | Nov. 30, 1943 |
| 2,379,982 | Mitchell | July 10, 1945 |

FOREIGN PATENTS

| Number | Country | Date |
|---|---|---|
| 16,426 | Great Britain | 1909 |
| 200,453 | Germany | July 20, 1908 |